United States Patent [19]

Ware et al.

[11] 4,343,654
[45] Aug. 10, 1982

[54] PROCESS FOR THE PRODUCTION OF CORRUGATED PAPERBOARD ADHESIVE

[75] Inventors: Franklyn O. Ware, Danville, Ill.; William S. McDonald, Statesville, N.C.

[73] Assignee: MPW Tech. Associates, Danville, Ill.

[21] Appl. No.: 119,904

[22] Filed: Feb. 8, 1980

[51] Int. Cl.³ .................... C08L 3/10; C08L 3/20; C09J 3/06
[52] U.S. Cl. .................... 106/213; 106/210
[58] Field of Search .................... 106/210, 213

[56] References Cited
U.S. PATENT DOCUMENTS 2,307,684  1/1943  Kauffmann et al. ............ 127/33
3,539,366  11/1970 Ewing .......................... 106/213
4,165,992  8/1979  Azumada et al. ............... 106/210

OTHER PUBLICATIONS

R. W. Kerr, "Chemistry & Industry of Starch", 1950, p. 597.

Primary Examiner—Allan Lieberman
Assistant Examiner—P. Short
Attorney, Agent, or Firm—Millen & White

[57] ABSTRACT

Improved Stein-Hall type adhesives having an uncooked slurry portion and a cooked carrier portion wherein the carrier portion is produced by cooking a slurry of a starch having substantial amylopectin content, at an alkaline pH, in the presence of an amount of hydrogen peroxide sufficient to lower the viscosity of the cooked carrier to that of conventional Stein-Hall carriers, viz., so that when added to the secondary slurry, the viscosity of the finished adhesive will be about 40 to 50 seconds (Stein-Hall) at 100°–105° F., and in the presence of a catalyst effective to reduce the cooking time required to reach that viscosity to about 15 minutes or less.

10 Claims, No Drawings

PROCESS FOR THE PRODUCTION OF CORRUGATED PAPERBOARD ADHESIVE

BACKGROUND OF THE INVENTION

This invention relates to a novel process for the production of corrugated paperboard adhesive and to the novel adhesives thus produced.

Corrugated paperboard adhesives having a cooked or carrier portion and an uncooked or secondary portion are conventionally produced from pearl corn starch, or, to a lesser extent, from tapioca or wheat starch. However, in U.S. Pat. Nos. 3,775,144 and 3,775,145, Alan M, Hill and I disclose processes employing high pressure steam in a jet cooker, which permits the use of flour instead of starch in the carrier portion. In U.S. Pat. No. 3,859,108, we disclose such a process for the production of a size for paper, in which optionally the flour is first subjected to a viscosity reducing treatment with enzyme or hydrogen peroxide.

It has been known for over 10 years that a corrugated adhesive whose carrier portion is prepared from a high amylose (about 80%) starch is superior to one prepared from pearl starch, which contains about 27% amylose because a higher solids content carrier can be produced having rheological properties comparable to carriers of lower solids content produced from pearl starch. High amylose starch was originally produced by alcohol precipitation and was exxtremely expensive, viz., about $100/cwt. compared to about $9/cwt. currently for pearl starch. After corn hybrids were developed from which a starch having an 80:20 ratio of amylose to amylopectin could be produced, its use as a corrugated adhesive became feasible. Such a starch is sold by National Starch under the trademark "Vinamyl." That starch is still expensive, its current price being about 3-4 times that of pearl starch.

Although the advantages of a high amylose starch over conventional pearl starch as a corrugated starch has been known for at least 10 years and although it is known that starch pastes can be thinned with hydrogen peroxide, to date no method has been developed which can cheaply convert conventional low amylose starches using standard equipment present in all corrugating plants, into a corrugated adhesive having the properties of an adhesive produced from a high amylose starch, such as "Vinamyl."

It is an object of this invention to provide such a process. It is another object to provide novel Stein-Hall type composite corrugated paperboard adhesives produced according to the process of this invention. Other objects will be apparent to those skilled in the art to which this invention pertains.

SUMMARY OF THE INVENTION

According to this invention, there is provided a process for the production of a composite adhesive for the commercial production of corrugated paperboard having an uncooked portion and an amount of a cooked portion as a carrier for the uncooked portion sufficient to impart substantial tack to the adhesive, which comprises employing as the cooked portion a carrier produced by cooking a slurry of a starch having substantial amylopectin content, at an alkaline pH, in the presence of an amount of hydrogen peroxide sufficient to lower the viscosity of the carrier to conventional levels, viz., whereby the viscosity of the finished adhesive will be about 40–50 seconds (Stein-Hall) at 100°–105° F., and in the presence of a catalyst effective to reduce the cooking time required to reach that viscosity to about 15 minutes or less.

DETAILED DISCUSSION

Although the preferred starting material is conventional pearl corn starch, the properties of adhesives produced from any starch having significant amylopectin content can be improved according to the process of this invention. Preferred starting materials are starches having substantial, i.e., at least 50% and preferably at least 70%, amylopectin content, e.g., milo, wheat, tapioca, buckwheat, barley, oat or other grain starch.

Because of the reduced viscosity of the carrier, the amount of starch employed in the starting slurry to produce the carrier portion of the adhesive is comparable to that employed when using a high amylose starch, e.g., from 5 to 45%, preferably about 10 to 36%, most preferably about 20 to 32% solids.

The $H_2O_2$ is conventionally employed as a 35% aqueous solution. However, all concentrations, e.g., from 2% to 90%, can be employed.

The weight ratio of starch (ambient moisture content) to $H_2O_2$ (calculated as 100%) can vary from about 300:1 to 600:1. The preferred range is about 500:1 to 550:1. The optimum ratio for achieving the desired reduction in the viscosity of the cooked carrier can readily be determined by simple laboratory experiments on aliquots of the slurry.

Although the desired reduction in viscosity of the cooked carrier can be achieved with $H_2O_2$ alone, the time required to do so is far too long to fit into the scheduling of the starch kitchen of a corrugating plant. Such scheduling requires that the cooking be complete within about 15 minutes. Therefore, a catalyst known to catalyze $H_2O_2$ oxidations is employed to reduce the cooking time required to reach the desired viscosity. Preferred are water-soluble reducing salts, e.g., the lower valence salts of polyvalent metals, including $Cu_2SO_4$ and $FeSO_4$. $FeSO_4$ is the preferred catalyst.

Only catalytic amounts of these salts are employed, e.g., in a weight ratio of $H_2O_2$ to catalyst salt of about 15:1 to 40:1, preferably about 20:1 to 25:1. The exact ratio is not critical.

The cooking of the starch is conducted in the conventional manner in the presence of base, preferably in a weight ratio of starch (ambient moisture content) to caustic (calculated as NaOH) of about 5:1 to 20:1, preferably about 8:1 to 12:1.

The cooking time is about 15 minutes or less. The cooking temperature is that conventionally employed, e.g., 130°–145° F. The amount of water employed also is conventional, e.g., about 0.3–0.4 gallon per pound of starch initially with a further 0.05 to 0.15 gallon per pound optionally employed for dilution and rinsing purposes to transfer the cooked carrier to the secondary portion.

In carrying out the process of this invention, the starting slurry is prepared in a conventional manner, i.e., uniformly dispersing the starch in water to the desired solids content. Preferably, the $H_2O_2$ is first added thereto, followed by caustic and catalyst. However, other orders of mixing can be employed. Heating is then initiated with gentle stirring of the slurry. Cooking temperature is maintained until reduction in viscosity to a conventional Stein-Hall carrier is achieved, preferably that which will produce a finished adhesive when admixed in a conventional ratio with slurry having a viscosity of about 40–50 sec. (Stein-Hall) at 100°–105° F. The optimum final viscosity can readily be determined by mixing aliquots of the carrier with the appropriate ratio of the slurry and measuring the viscosity of the final adhesive.

To produce a composite corrugated paperboard adhesive, the cooked carrier is blended with an uncooked starch slurry in a conventional manner, e.g., in a one to five ratio, calculated on total solids. This ratio of cooked solids to uncooked solids can vary widely, i.e., the proportion of cooked flour can vary from about one-thirty second to 100 percent, preferably about one-twelfth to one-half, more preferably about one-sixth to about one-third, the exact proportion depending on the desired final viscosity of the composite adhesive. The use of a carrier having a higher solids content has the known advantages associated with the use of a high solids content carrier produced from high amylose starch.

Other ingredients conventionally employed in Stein-Hall type corrugated paperboard adhesives can and preferably are employed in the novel adhesives of this invention. For example, about 0.25 to 2 percent, preferably 0.75 to 1.25 percent, calculated on total solids of borax, can be employed to increase tack and/or about 0.5 to 3 percent, preferably about 1.5 to 2.0 percent, calculated on total solids, of caustic soda or other alkali can be added to regulate gel temperature.

The resulting corrugating adhesive can be used like a conventional Stein-Hall starch adhesive in the production of corrugated paperboard. Generally, the adhesive pick-up required to manufacture satisfactory board is about the same as with conventional Stein-Hall adhesives. However, substantially higher production rates are possible employing the novel adhesives. Properties of both standard and wax impregnated corrugated paperboard produced employing the adhesive are at least as good as obtained from a comparable adhesive produced from high amylose starch. The exact chemical nature of the oxidized starch is not known. However, it is believed that is consists of a mixture of the naturally occurring amylose and fragments cleaved at the 1→6 α-glycosidic bonds of the amylopectin which are more linear than amylopectin and therefore produce carriers of lower viscosity.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE

Dissolve 32 lbs. of caustic pellets in 10 gals. of water. The temperature of the solution rises to about 180° F. Prepare a fresh solution of 0.033 lb. of $FeSO_4$ in 1 pint of water and add to the caustic solution.

In a standard mixer, prepare a slurry of 1,400 lbs. of pearl starch, 21 lbs. of borax (5 molar) and 85 lbs. of waterproofing resin ("Amrez", Pacific Resins) in 350 gals. of water (85° F.)

In another conventional mixing tank, prepare a slurry of 400 lbs. of pearl cornstarch in 130 gals. of tap water. Add 1.5 pts. of 35% $H_2O_2$ and heat the slurry to 140°. Add the $FeSO_4$ and caustic solutions. Stir for 15 minutes at about 145° F. The cooked slurry should have about the same viscosity as conventional slurries from pearl starch. If the viscosity is too high, lower by the addition of additional $H_2O_2$ and $FeSO_4$ and hold for an additional 5–15 minutes.

Dilute the converted starch paste with 20 gals. of water. Mix for 5 minutes and add a further 15 gals. of water. Add the carrier (130° F.) to the secondary slurry. Adjust viscosity as required to 40–50 sec/100°–105° F. (Stein-Hall) with water. Yield of composite adhesive is about 710 gals.

The above is a high performance waterproof corrugated adhesive. A high performance adhesive for regular or domestic paperboard is produced by lowering the amount of starch in the secondary to 1,000 lbs.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for the production in the starch kitchen of a corrugating plant of a Stein-Hall composite adhesive whose carrier portion has the high solids content conventionally achieved only with a high amylose starch, employing a starch having a substantial amylopectin content, which comprises (a) employing in the cooked portion a starch having a substantial amylopectin content; (b) employing an amount of the starch in the slurry used to produce the cooked portion in excess of that which would produce a viscosity low enough, if the slurry were cooked conventionally, to be acceptable for use in a Stein-Hall composite adhesive; and (c) cooking the slurry at an alkaline pH, in the presence of an amount of hydrogen peroxide, in a weight ratio to the starch of from about 300:1 to 600:1, which is sufficient to lower the viscosity of the cooked carrier to that of conventional Stein-Hall carriers and in the presence of an amount of a catalyst, in a weight ratio of $H_2O_2$ to catalyst of about 15:1 to 40:1, which is effective to reduce the cooking time required to reach that viscosity to about 15 minutes or less.

2. A process according to claim 1 wherein the starch is pearl starch.

3. A process according to claim 1 wherein the catalyst is $FeSO_4$.

4. A process according to claim 3 wherein the hydrogen peroxide is added to the starch and the $FeSO_4$ is added thereafter with caustic employed to provide the alkaline pH.

5. A process according to claim 1 wherein the weight ratio of starch to $H_2O_2$ is about 500:1 to 550:1 and the weight ratio of $H_2O_2$ to catalyst is 20:1 to 25:1.

6. A process according to claim 5 wherein the starch is pearl starch.

7. A process according to claim 6 wherein the catalyst is $FeSO_4$.

8. The process according to claim 7 wherein the starch slurry is cooked at about 130°–140° F. for about 15 minutes.

9. In a composite adhesive for the commercial production of corrugated paperboard having an uncooked portion and an amount of a cooked portion as a carrier for the uncooked portion sufficient to impart substantial tack to the adhesive, the improvement wherein the cooked portion is produced according to the process of claim 1.

10. A composite adhesive according to claim 9 wherein the starting starch employed to produce the cooked portion is pearl corn starch.

* * * * *